(12) United States Patent
Ebergen

(10) Patent No.: US 6,700,825 B1
(45) Date of Patent: Mar. 2, 2004

(54) IMPLEMENTATION OF A MULTI-DIMENSIONAL, LOW LATENCY, FIRST-IN FIRST-OUT (FIFO) BUFFER

(75) Inventor: Josephus C. Ebergen, San Francisco, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 437 days.

(21) Appl. No.: 09/677,442

(22) Filed: Sep. 29, 2000

(51) Int. Cl.$^7$ ............................................. G11C 7/00
(52) U.S. Cl. ........................................ 365/221; 365/239
(58) Field of Search ................................ 365/221, 239

(56) References Cited

U.S. PATENT DOCUMENTS

| | | | |
|---|---|---|---|
| 4,819,201 A | 4/1989 | Thomas et al. ............. | 364/900 |
| 5,065,394 A | 11/1991 | Zhang ............................ | 11/4 |
| 5,230,067 A | 7/1993 | Buch ........................... | 395/275 |
| 5,291,453 A | 3/1994 | Aota et al. .................. | 365/221 |
| 5,365,485 A * | 11/1994 | Ward et al. .................. | 365/221 |
| 5,511,170 A | 4/1996 | Abdoo ........................ | 395/280 |
| 5,521,876 A | 5/1996 | Hattori et al. .............. | 365/221 |
| 5,550,780 A | 8/1996 | Chu ............................. | 365/221 |
| 5,758,139 A | 5/1998 | Sutherland et al. ......... | 395/559 |
| 5,818,884 A | 10/1998 | Reymond ................... | 375/354 |
| 5,946,260 A * | 8/1999 | Manning ................ | 365/230.03 |
| 6,005,412 A | 12/1999 | Ranjan et al. ................ | 326/63 |
| 6,058,439 A | 5/2000 | Deveraux ..................... | 710/52 |
| 6,204,696 B1 | 3/2001 | Krishnamurthy et al. ..... | 326/98 |

FOREIGN PATENT DOCUMENTS

| | | | | |
|---|---|---|---|---|
| EP | 0 472 879 A2 | 7/1991 | ........... | G06F/15/16 |
| EP | 0 494 447 A1 | 12/1991 | | |
| EP | 0 506 135 A2 | 3/1992 | ........... | G06F/15/16 |
| EP | 1 016 980 A2 | 12/1999 | ......... | G06F/15/173 |

OTHER PUBLICATIONS

Publication entitled "Asynchronous Circuits and Systems: a Promising Design Alternative", by M. Renaudin, Microelectronic Engineering 54, 2000, pp. 133–149.

Publication entitled "Utilising Dynamic Logic for Low Power Consumption in Asynchronous Circuits", by C. Farnsworth et al., The University, IEEE, 1994, pp. 186–194.

Publication entitled "High–Throughput Asynchronous Pipelines for Fine–Grain Dynamic Datapaths", by Montek Singh et al., Columbia University, IEEE, 2000, pp. 198–209.

Publication entitled "The Design and Simulation of FIFO Using Self–Timed Based Asynchronous Circuit Elements", by Hussein Tiawi Bahbouth et al., Fifteenth National Radio Science Conference, Feb. 24–26, 1998, Helwan, Egypt, C5–1.

Article entitled "Low Latency Self–Timed Flow–Through FIFOs", by Erik Brunvand, Dept. of Computer Science, University of Utah, SLC, Utah, 84112.

Article entitled "Low Latency Self–Timed Flow–Through FIFOs", by Erik Brunvand, Dept. of Computer Science, University of Utah, SLC, Utah 84112 (No Date).

* cited by examiner

Primary Examiner—Michael S. Lebentritt
Assistant Examiner—Tuan T. Nguyen
(74) Attorney, Agent, or Firm—Park, Vaughn & Fleming LLP

(57) ABSTRACT

A novel FIFO data structure in the form of a multi-dimensional FIFO. For a rectangular multi-dimensional FIFO, data items are received at an input of an N-row-by-M-column FIFO array of cells and transferred to an output, via a predetermined protocol of cell transfers, in the same order as received. Transfer rules or protocol are controlled by a control circuit implemented using asynchronous pipeline modules or a control circuit relying upon transition signaling.

20 Claims, 8 Drawing Sheets

IMPLEMENTATION OF A MULTI-DIMENSIONAL, LOW LATENCY, FIRST-IN FIRST-OUT (FIFO) BUFFER

RELATED APPLICATION

The subject matter of this application is related to the subject matter in a non-provisional application filed on the same day as the instant application by inventors Ivan E. Sutherland, Scott M. Fairbanks and Josephus C. Ebergen, entitled "Asynchronously Controlling State Information within a Circuit," having serial number 09/676,430 and filing date Sep. 29, 2000. The subject matter of this application is also related to the subject matter in a non-provisional application filed on the same day as the instant application by inventors Ivan E. Sutherland, Scott M. Fairbanks and Josephus C. Ebergen, entitled "Method and Apparatus for Asynchronously Controlling Data Transfers Within a Circuit," having serial number 09/676,428, and filing date Sep. 29, 2000. The instant application hereby incorporates by reference the above-listed patent applications.

BACKGROUND

This invention relates to first-in, first-out (FIFO) data structures, and in particular to multidimensional, nonlinear FIFO structures.

FIG. 1 shows a conventional flow-through FIFO circuit 50. In circuit 50, a data item is received on an input node 55, where a first stage 60(1) accepts the data item and passes it to a second stage 60(2), and so on to a third stage 60(3) and a fourth stage 60(4), or more, until the data item is output on output node 56 in the order in which it was received. An interconnect 58 in the form of wires or other type of data connection links pairs of successive stages.

Usually, FIFO circuits use some form of control mechanism to control the sequential transition of data items from one stage to another. FIG. 2 is a simplified circuit diagram that illustrates a conventional linear first-in, first-out (FIFO) data structure 100 with control circuitry. FIFO data structure 100 includes a data path 101, on which data items are sequentially moved, and a control path 102. A data item can be any type of information signal and can comprise of any number of bits, words, etc. Control signals are digital signals or other signals that reflect the state of data path 101, and direct the data path structures to move data items according to a predetermined protocol.

In the data path structure shown in FIG. 2, a plurality of data path cells 105 are interconnected in series. A first data item is received at an input to a first data path cell 105(1), where the first data item is processed and output to a next data path cell 105(2). The data item is processed in the next data path cell and the routine is repeated again as the data item is again output to a next data path cell 105(3). The state of each data path cell 105 is monitored and controlled by a corresponding control cell 110. In a simplistic example, control cell 110(1) detects when data path cell 105(1) has received a data item, and then directs data path cell 105(1) to process the data item and send it to the next data path cell 105(2). Control cell 110(1) sends command and status information to the next control cell 110(2) in the series, so that cell 110(2) is able to detect when the data item is received in the next data path cell 105(2).

One problem that arises in linear FIFO data structures is a high latency from first input to final output. As each processing stage must wait for the output of a stage before it, delays in each stage are cumulative. Thus, more stages in the FIFO leads to a higher latency. Another problem with linear FIFO data structures is high energy consumption. For a linear flow-through FIFO, the energy consumption per data item that flows through the FIFO is approximately proportional to the total number of stages in the FIFO. More stages in a FIFO leads to more energy consumption.

SUMMARY

Generally, the present invention provides a method and apparatus for a multi-dimensional, low-latency, energy efficient and high throughput data structure that exhibits FIFO behavior.

In a first aspect of the invention, a data structure includes an N-row-by-M-column array of data path cells, where N and M are integers greater than one. A first cell of a first row of the array is configured to receive an ordered stream of data items. A control circuit is coupled to the array and configured to sequentially move individual data items to particular cells in the array. In one sequence, data items flow sequentially into the first row of the array (with M cells per row), flow separately down the M columns of the array, and then flow sequentially through the M cells of the Nth row to an output from the Mth cell of the Nth row in the array.

In a second aspect of the invention, a nonlinear FIFO data structure includes an input data path cell configured to receive an ordered stream of data items via an input interconnect; an output data path cell configured to receive the ordered stream of data via an output interconnect; a plurality of intermediate data path cells connected between the input data path cell and the output data path cell in an array of rows and columns, wherein a first row is coupled to the input data cell and a last row is coupled to the output data path cell; a plurality of intermediate interconnects connecting each intermediate cell with intermediate cells adjacent to it; and control circuitry coupled to the input, output and intermediate interconnects configured to sequentially move individual data items from the input cell to particular data path cells in the first row, separately down columns of the data path cells, and then sequentially from particular data path cells of the last row to the output cell, such that the individual data items are output to the output cell in the order received at the input cell.

In a third aspect of the invention, a FIFO data structure includes an input pass gate configured to receive an ordered stream of data items from an input cell; an N-row-by-M-column array of data path cells, where N is greater than one and M is greater than one, the array of data path cells having an input row coupled to the input cell; a plurality of pass gates, each pass gate interconnecting adjacent cells in the input row, adjacent cells in an output row, and cells adjacent to the remaining cells in the array, each pass gate configured to receive a data item from a previous cell and sequentially pass the received data item to a next cell according to a predetermined sequence; a control circuit that controls the individual movement of data items through the plurality of pass gates, first through successive pass gates of the input row cells, from selected input-row cells through successive pass gates of columns comprising, in part, the remaining cells, and then through successive pass gates of the output row; and an output pass gate coupled to the Mth-row, Nth-column cell, configured to output the processed data items, wherein the control circuit follows the predetermined sequence such that the data items are output in the order received at the input pass gate.

In a fourth aspect of the invention, a data structure having an N-row-by-M-column array of communication cells includes a data path circuit having a plurality of sticky buffers, one to each cell, and a plurality of pass gates, configured to communicatively couple adjacent cells in an input row of the array, adjacent cells in an output row of the array, and any cell adjacent to other cells in the array; and a control circuit that controls movement of data items in the data path circuit from one sticky buffer to a next sticky buffer, by making a pass gate therebetween transparent.

In a fifth aspect of the invention, a two-dimensional first-in, first-out (FIFO) data structure includes an N-row-by-M-column array of individual FIFO cells having a data path, including a data buffer within each FIFO cell, and a pass gate between adjacent cells; and a control circuit in communication with the data path and configured to control data propagation along various predefined routes in the data path.

In a sixth aspect of the invention, an asynchronous pipeline module for use in a multi-dimensional FIFO data structure includes a NAND logic gate having a first input configured to receive a first control signal, a second input configured to receive an inverse of a second control signal and an output; a first inverter coupled between the output of the NAND logic gate and an associated pass gate so that the pass gate receives the inverse of the output of the NAND logic gate; a first transistor having a gate coupled to the inverse of the output of the NAND logic gate, a drain coupled to the first control signal and a source coupled to ground; a second transistor having a gate coupled to the output of the NAND logic gate, a drain coupled to the second control signal and a source coupled to a power supply; and at least one drive transistor having a gate coupled to the gate of either the first or second transistor, a source coupled to either ground or the power supply, respectively, and a drain that embodies an output of the asynchronous pipeline module.

In a seventh aspect of the invention, a method of moving data items through a two-dimensional first-in, first-out FIFO arranged in an N-row-by-M-column array of individual FIFO cells includes the steps of moving a first data item into an input cell located in an input row and an input column of the array; moving the first data item through cells in the input row and into an Mth cell in the Mth column; moving the first data item down through cells in the Mth column and into an output cell in the Nth row; moving the first data item out of the output cell; moving every k-th data item, where 0<k<M+1, into the input cell; moving the k-th data item through cells in the input row and into an (M+1−k)th cell in the (M+1−k)th column; moving every k-th data item down through cells in the (M+1−k)th column and into the (M+1−k)th cell in the Nth row; moving every k-th data item into the output cell in the Nth row; and moving every k-th data item out of the output cell.

In an eighth aspect of the invention, a multi-dimensional first-in, first-out (FIFO) data structure includes a distributor having a first plurality of data cells configured to receive data items, one data item at a time; a plurality of FIFOs having inputs individually coupled to the first plurality of cells of the distributor; and a collector having a second plurality of cells individually coupled to outputs of the FIFOs, the collector configured to collect the data items, one data item at a time. In this embodiment data items are distributed and collected, via the plurality of FIFOs, according to a predefined round-robin scheme as will be explained in more detail below in the detailed description of the invention.

The following detailed description and the accompanying drawings provide a better understanding of the nature and advantages of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
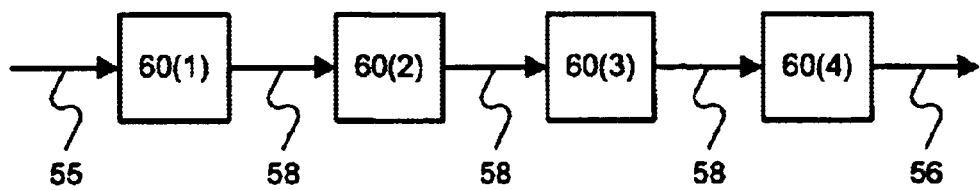
FIG. 1 is a simplified linear flow-through first-in, first-out, FIFO circuit.
Figure 2:
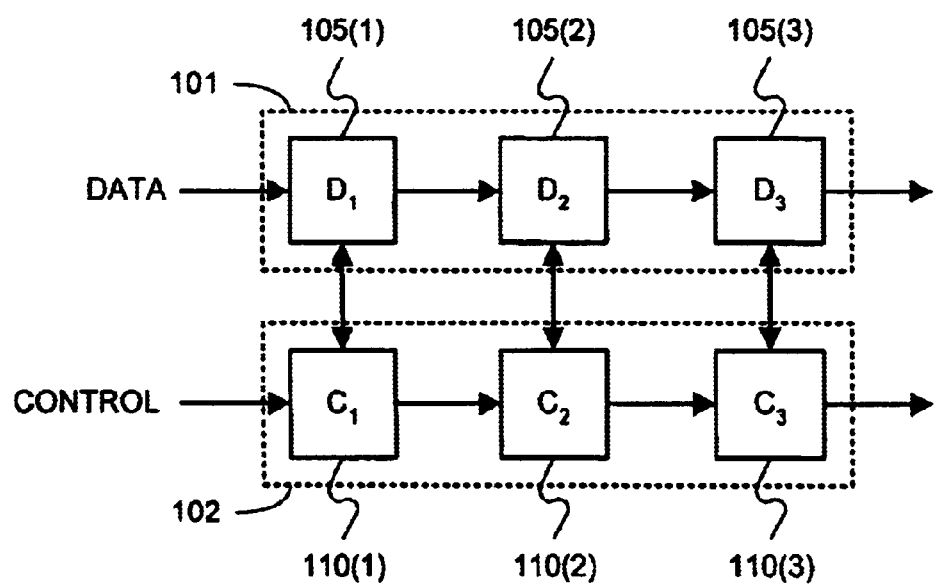
FIG. 2 is a simplified circuit diagram of a conventional linear FIFO data structure with control circuitry.

This invention provides a novel first-in, first-out (FIFO) data structure in the form of a rectangular FIFO. In contrast to FIFO implementations consisting of a linear array of cells as illustrated in FIGS. 1 and 2, an embodiment of the rectangular FIFO is implemented with a two-dimensional array of cells. Data items are received at an input of the rectangular FIFO, individually distributed over the array of cells from particular cells, and recollected at particular cells to be output in the same order as received. The input-output behavior satisfies well-known FIFO behavior.

Figure 3:
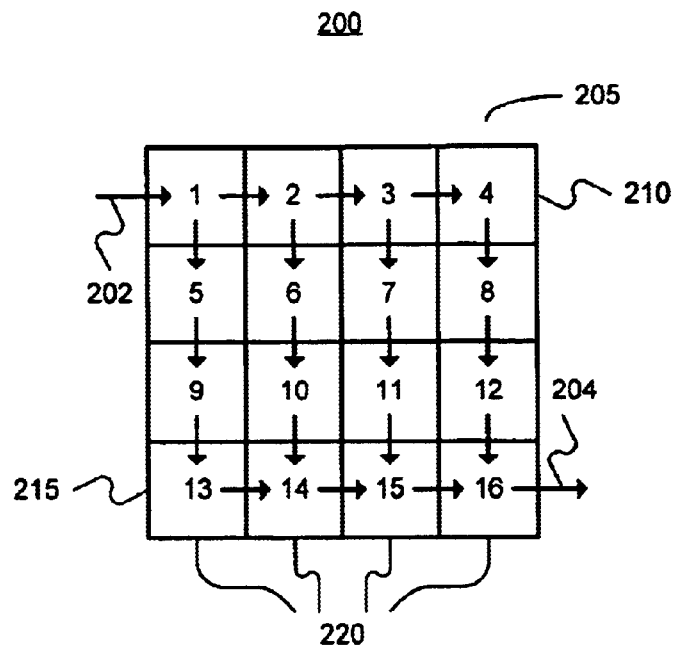
FIG. 3 shows an exemplary embodiment of a FIFO according to the present invention.

FIG. 3 illustrates an embodiment of a rectangular FIFO according to one embodiment of the present invention. A FIFO data structure 200 includes an N×M array of cells 205 arranged in N rows and M columns. The data structure in FIG. 3 is shown as a four-row-by-four-column square array for simplicity and ease of illustration. However, a data structure according to the invention may be configured with any size rectangular array. The data structure 200 is a collection of cells, where each cell preferably has a capacity to hold one data item. Communication among cells is local in that data flows only between adjacent cells. In the preferred embodiment, some cells can communicate with more than two other adjacent cells in two dimensions, such as between a cell in the first row and a column cell and other row cells. Some cells only communicate with one immediately preceding cell and one immediately following cell, in one-dimensional fashion.

Data structure 200 is an array of 16 cells with an input 202 and an output 204. In this example, the input is to the first cell of the first row in the array 200 and the output is from the last cell of the last, or bottom, row in the array 200. However, other configurations work as well. The array includes a top row 210, a bottom row 215, and a number of columns 220, each of which operates according to a predetermined protocol. Interconnections among neighboring cells are represented by arrows crossing cell boundaries.

In a preferred embodiment, cells in columns 220 are simple linear FIFOs. An ordered stream of data items is received at input 202. The top row 215 distributes the data items to the columns 220 in a round-robin fashion. The bottom row 215 collects the data items from a bottom cell in each column 220, also in a round-robin fashion. The collected data items are moved across the bottom row 215 to the output 204, where the data items are output in the order in which they were received at the input 202.

The path by which each individual data item is sent through the FIFO data structure 200 will now be explained with reference to FIG. 3. Each of the sixteen cells is numbered sequentially, from a first row, first column cell 1 to a last row, last column cell 16. Arrows between adjacent cells indicate a flow or transition between such cells. In the example shown, the first data item received on input 202 moves all the way down row 210 to cell 4, then drops down through the fourth column via cell 8 to cell 16, after which it is output on output node 204. The second data item moves across row 210 to cell 3, and then drops down to cell 15, after which it follows the first data item to cell 16 and is output accordingly. Similarly, the third data item propagates down from cell 2, the fourth data item propagates down from cell 1. In an alternative embodiment, the data items first move down a column, then across a row.

Figure 4:
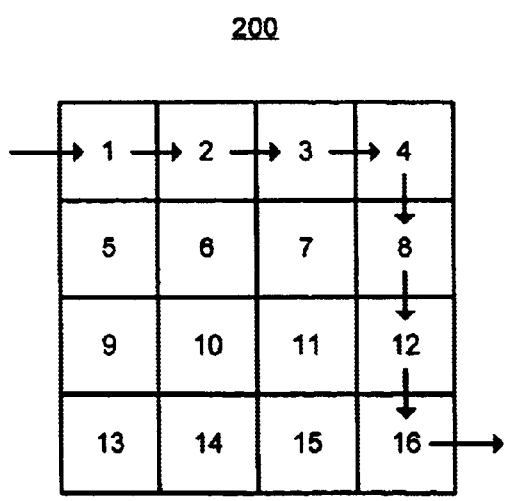
FIG. 4 shows a data path taken by every $4n+1^{st}$ data item, where the number 4 indicates an array having four columns, and where $n \geq 0$.
Figure 5:
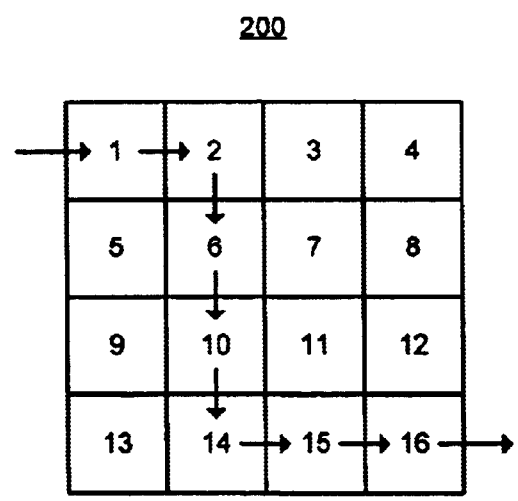
FIG. 5 shows a data path taken by every $4n+3^{rd}$ data item, where the number 4 indicates an array having four columns, and where $n \geq 0$.

The round-robin protocol just described then repeats for the fifth data item, according to the embodiment shown. FIG. 4 shows the data path taken by every $4n+1^{st}$ data item for $n \geq 0$, where the array has four rows and four columns. FIG. 5 shows the data path taken by every $4n+3^{rd}$ data item. Every data item makes only N+M+1 cell-to-cell moves to propagate through the data structure 200. In a conventional linear FIFO arrangement of N×M cells, by contrast, each data item requires N×M+1 moves to propagate through the FIFO. The total number of moves proportionally determines the total forward latency of a FIFO and its power consumption. Thus, the FIFO data structure according to the invention has a much lower latency and power consumption than conventional linear FIFO data structures.

Figure 6:
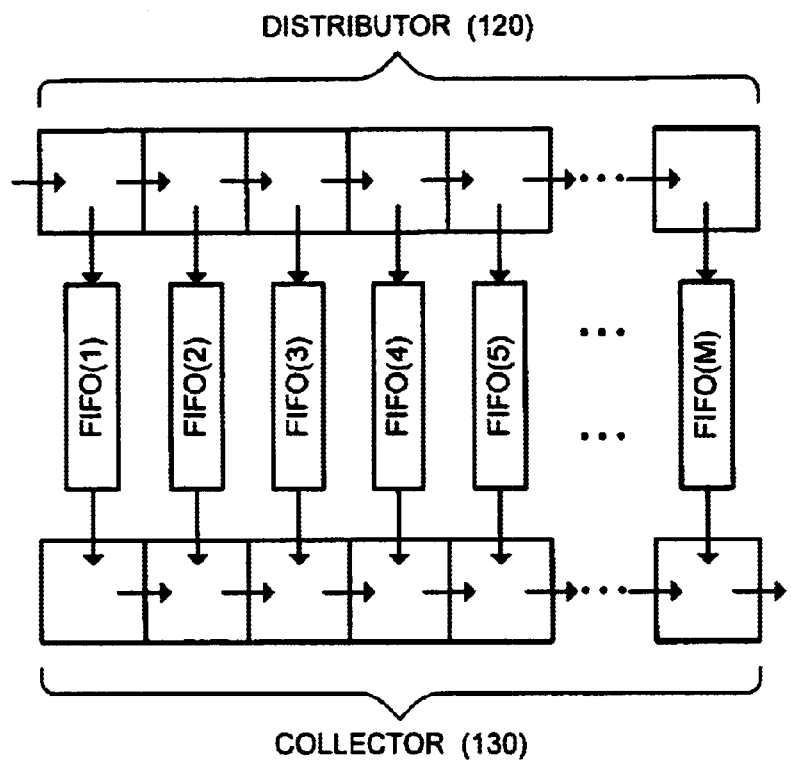
FIG. 6 shows a D-dimensional FIFO implementation of an embodiment of the present invention, where D=2, 3, 4, etc and each FIFO(m), 0<m<M+1, is a (D−1)-dimensional FIFO according to the present invention.

The two-dimensional, rectangular FIFO implementation can be generalized easily to D dimensions, where $D \geq 2$. FIG. 6 illustrates this idea. A D-dimensional FIFO implementation consists of a distributor 120, a collector 130 and a number of (D–1)-dimensional FIFO implementations. Distributor 120 is the same as the top row in the rectangular FIFO implementation. Each cell in distributor 120 is connected to its adjacent cells and to a (D–1)-dimensional FIFO.

Figure 7:
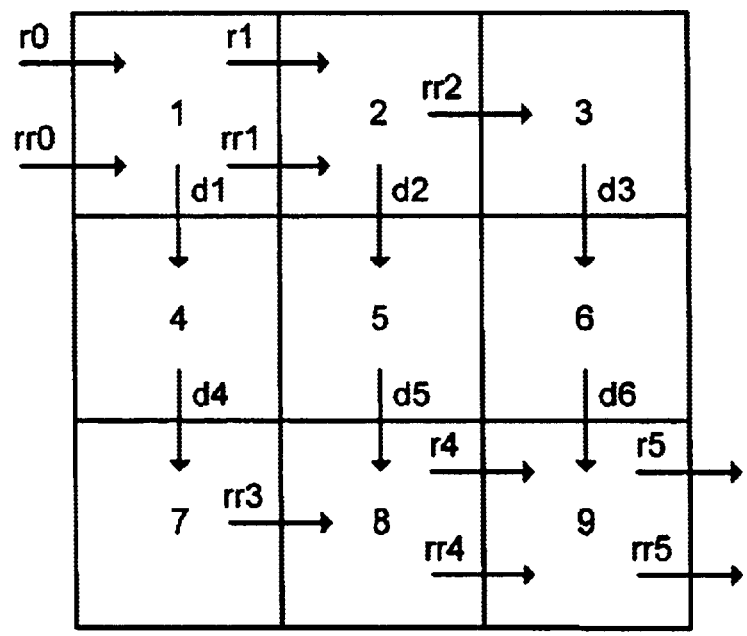
FIG. 7 shows an exemplary 3×3 FIFO illustrating notation used to describe various movements of data items between adjacent cells of a FIFO, according to the present invention.

Referring now to FIG. 7, there is shown a 3×3 array including notations (arrows with labels) that set forth the behaviors of each cell in terms of sequences of moves across its boundaries. Each cell contains at most one data item, so a given cell's behavior is simply an alternation of filling and emptying the cell with a data item. To describe the behavior of each cell, it is originally assumed that all cells in the array are empty. The set of behaviors for each cell is represented by "snippets", such that the complete set of all behaviors is the conjunction or parallel composition of all individual snippets.

An event is a move of a data item from one cell to an adjacent cell and is represented by an arrow crossing the boundary between the cells. Moves to the right are labeled with r and rr, like r0, r1, r4, r5, rr0, rr1, rr2, rr3, rr4 and rr5, and downward moves are labeled with a d, like d, like d1, d2, d3, d4, d5 and d6. The sequences of moves for each cell are given below by means of their snippets followed by an explanation.

Cell 1: *[r0;(r1|rr1;rr0;d1)]
Cell 2: *[r1;rr2;rr1;d2]
Cell 3: *[rr2;d3]
Cell 4: *[d1;d4]
Cell 5: *[d2;d5]
Cell 6: *[d3;d6]
Cell 7: *[d4;rr3]
Cell 8: *[d5;r4;rr3;rr4]
Cell 9: (d6;*[r5;(r4|rr4;rr5;d6)])

The "*" means that the sequence of events within the brackets is repeated. The "|" symbol means that either the events preceding the "|" are performed or the events following the "|" are performed. Events are performed sequentially, from left to right in the list, with each event separated by a ";". Note that the concatenation ";" has a higher priority than the selection "|". For example, r4|rr4;rr5;d6 means that either event r4 occurs or the sequence rr4;rr5;d6 occurs.

The sequences of moves for cells 8 and 9 in the bottom row are explained as follows. Each of the cells fills with a data item from its left or upper neighbor cell and then the data item moves to the right neighbor cell. The rule for filling the cell is as follows. If the current data item that passes through a bottom-row cell comes from the left-most cell, i.e. cell 7, the next data item for that cell must come from the cell above. Otherwise data items come from the cell to the left. Initially, the data item comes from the cell above. In order to implement this rule, moves rr3, rr4 and rr5 denote moves of a data item that originates from the leftmost cell in cell 7 of the bottom row. Moves r4 and r5 denote moves of data items that do not originate from the leftmost cell. As a result of the bottom-row rule, the communication behavior for cell 8 is given by the repetition *[d5;r4;rr3;rr4]. The communication behavior for cell 9 is given by the repetition (d6;*[r5;(r4|rr4;rr5;d6)]).

The sequences of moves for cells 1 and 2 of the top row are explained as follows. Each of the cells fills with a data item from the left neighbor cell and then the data item moves to the right neighbor cell or the neighbor cell below. The rule for emptying the cell is formulated by using the concept of a "bubble." A "bubble" is basically the absence of a data item, that is, an empty space into which a data item can move. With this interpretation of a bubble, a move involves both a move of a data item to the right and a move of a bubble to the left. The rule for the top row of cells is now as follows. If a data item moves into at top row cell by means of a swap with a bubble originating from the rightmost cell in the top row, i.e. cell 3, then the next data move from the cell must be down. Otherwise, the next data move must be to the right. Initially, each top-row cell is empty. In order to keep track of where a bubble came from, moves rr2, rr1 and rr0 denote moves of a data item swapping with a bubble that came from the rightmost cell in the top row, i.e. cell 3. Moves r1 and r0 denote moves that involve bubbles not originating from the rightmost cell in the top row. Because of the rule for the top row cells, the sequences of moves for cell 1 is given by the repetition *[r0;(r1|rr1;rr0;d1)].

Figure 8:
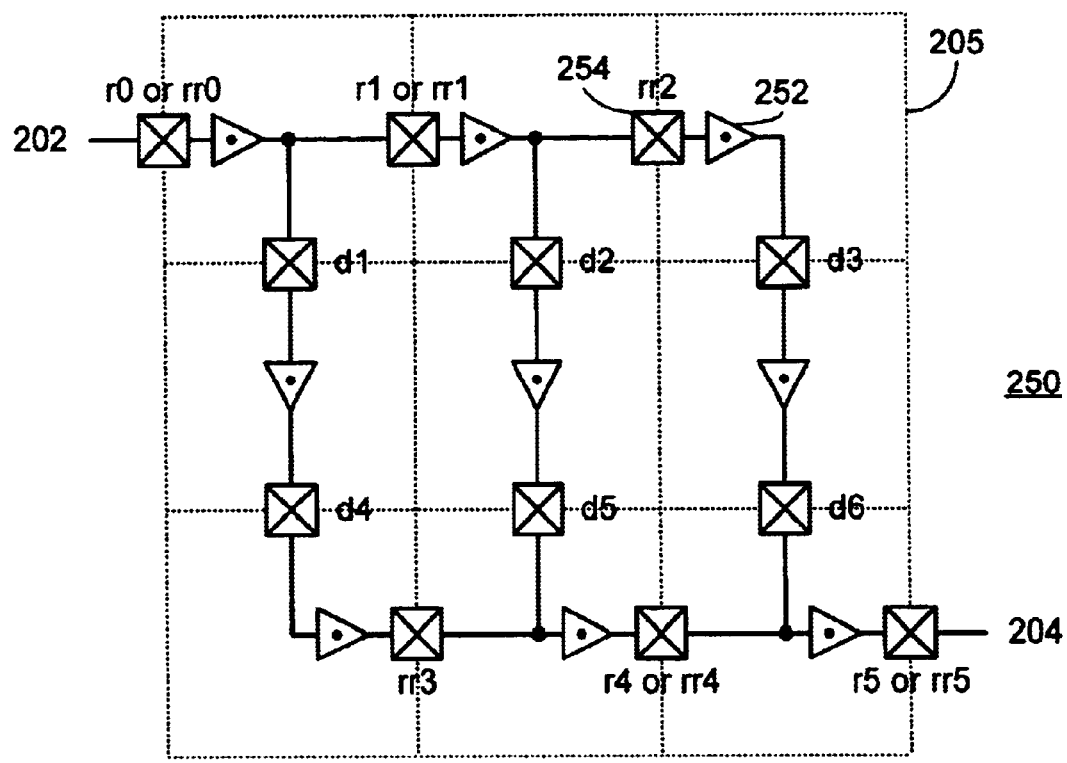
FIG. 8 shows a data path array for an exemplary 3×3 FIFO according to an embodiment of the present invention.

FIG. 8 illustrates a data path circuit 250 of a 3×3 cell array according to a preferred embodiment of the invention. Each cell 205 in the array includes a "sticky" buffer 252, which can be one of any well-known amplifier circuits that stores an output of the last value that goes through it, even if an input is no longer being driven. Pass gates 254 are at the boundaries of each cell 205 through which data items can move. Data items move through the data path circuit 250 when selected pass gates 254 are made transparent, i.e are made open to the passage of a data item. A given pass gate 254 is initially opaque, i.e., closed to a data item movement. A transparency pulse allows a data item to move directionally from one sticky buffer on one side of the pass gate, to the next sticky buffer beyond the pass gate. Transparency pulses issued to the pass gates are selectively directed by control circuitry coupled to the data path circuit 250. Symbols adjacent to the sticky buffers in FIG. 8 are in accordance with the notation in FIG. 7 describing the events for each cell.

Figure 9:
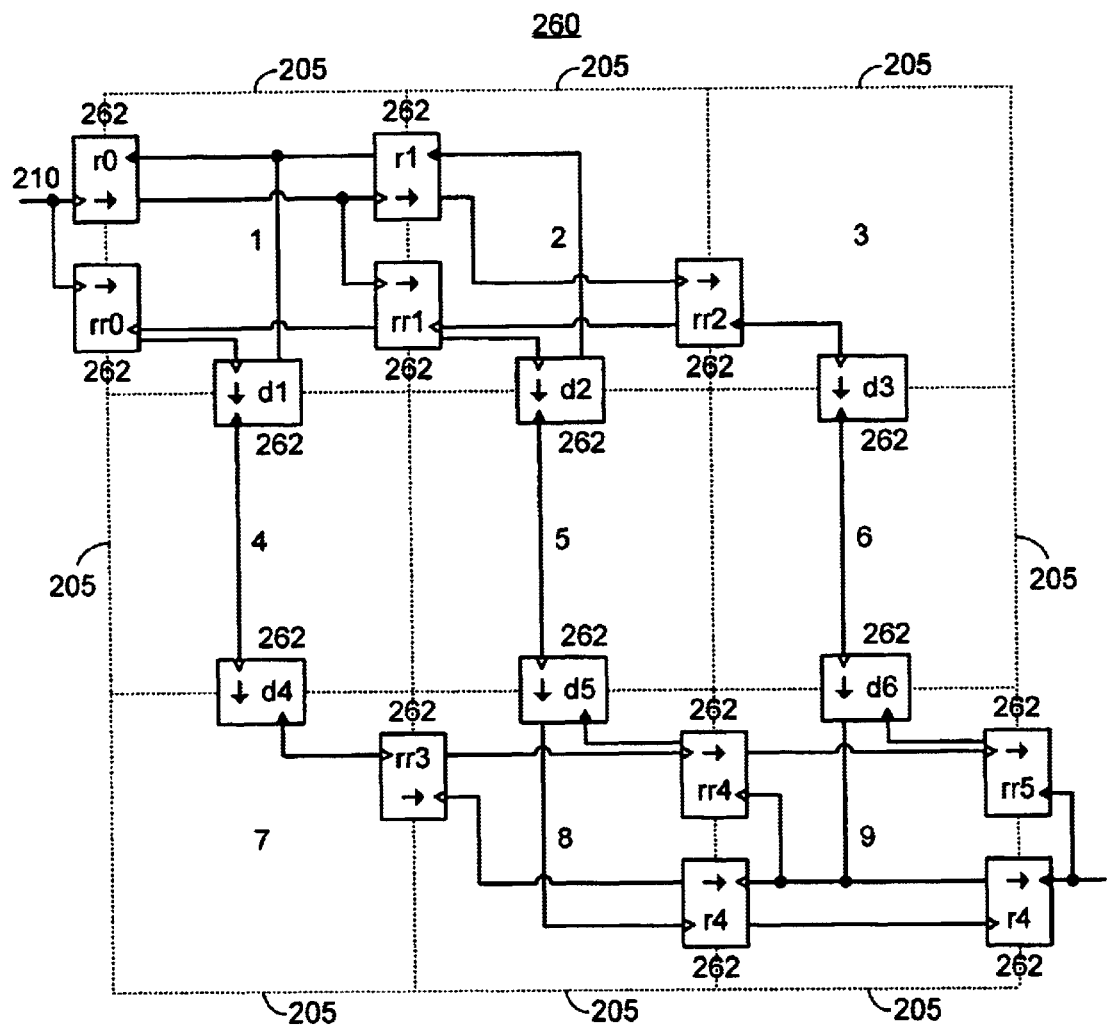
FIG. 9 shows an exemplary control circuit implementation using asynchronous pipeline modules for a two-dimensional FIFO according to an embodiment the present invention.

FIG. 9 shows an exemplary control circuit 260 of a 3×3 FIFO array, such as that shown in FIG. 7. Such a control circuit can be configured to control data movement through the 3×3 data path shown in FIG. 8. Control circuit 260 insures that the snippet sequences, described above in relation to FIG. 7, are performed according to specification.

According to the exemplary embodiment shown in FIG. 9, control circuit 260 comprises an array of asynchronous pipeline modules 262. Asynchronous pipeline modules are described in the related application by inventors Ivan E. Sutherland, Scott M. Fairbanks and Josephus C. Ebergen, entitled "Method and Apparatus for Asynchronously Controlling State Information within a Circuit," having serial number 09/676,430, and filing date Sep. 29, 2000. Each asynchronous pipeline modules 262 controls the behavior of a pass gate at the boundaries between cells 205.

Figure 10A:
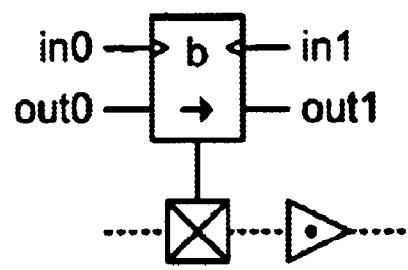
FIGS. 10(*a*) and 10(*b*) show an exemplary block diagram and an exemplary logic circuit representation of an asynchronous pipeline that can be used in the control circuit shown in FIG. 9.

FIG. 10(a) shows a schematic representation of a single basic asynchronous pipeline module 262 used in FIG. 9. The basic asynchronous pipeline module 262 shown in FIG. 10(a) is represented by a rectangular box with the letter "b" and an arrow within it. The letter "b" stands for an event "b". The basic module 262 in FIG. 10(a) has two so-called inputs, in0 and in1, and two outputs (or "drivers") out0 and out1. The small square box with an X represents a pass gate and the triangle with a dot represents a sticky buffer as was described previously in connection with FIG. 8. The pass gate and sticky buffer are within the FIFO data path (represented by a dashed line in FIGS. 10(a) and 10(b)) and are coupled to asynchronous pipeline module 262 by a single wire.

Figure 10B:
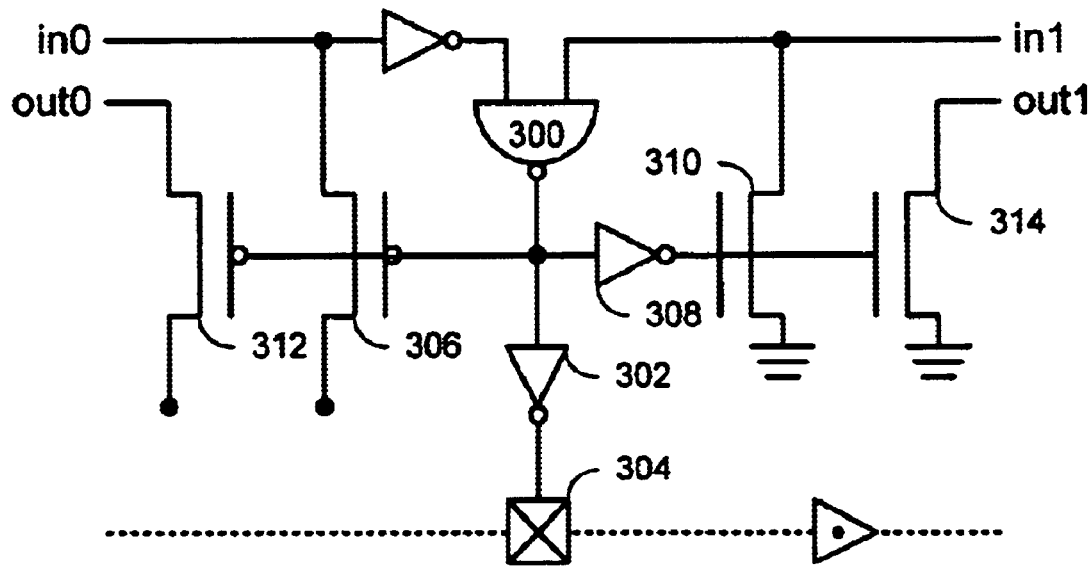

A circuit implementation of the basic asynchronous pipeline module 262 of FIG. 10(a) is shown in FIG. 10(b). In operation, when both inputs of the NAND logic gate 300 are at a HIGH logic level (i.e. when in0 is LOW and in1 is HIGH), a LOW signal is asserted at the output of NAND gate 300. This LOW signal is inverted to a HIGH signal by inverter 302. This HIGH signal, when applied to pass gate 304, makes pass gate 304 transparent, thereby allowing a data item to pass through pass gate 304 where it is captured and stored by the sticky buffer 306. The LOW signal asserted at the output of NAND gate 300 is also applied to the gate of PMOS transistors 306 and 312. A LOW signal on transistors 306 and 312 turn it on, thereby pulling input in0 and output out0, respectively, up to a HIGH value (Vcc). A high value on in0 acknowledges that the data item has been passed to sticky buffer 306. The LOW signal asserted at the output of NAND gate 300 is also inverted by inverter 308 so that NMOS transistors 310 and 314 turn on, thereby pulling input in1 and output out1, respectively, LOW. A LOW value on in1 indicates that data has been received by sticky buffer 306. When all transistors are appropriately sized in this implementation, both inputs to NAND gate 300 will go LOW at about the same time. The output of NAND gate 300 will subsequently go HIGH, and the output of inverter 302 will go LOW, making pass gate 304 opaque. The return to the LOW state of the output of inverter 302 marks the end of a brief pulse. During these pulses the pass gate is transparent thus executing the data movements in the data path.

The basic operation of an asynchronous pipeline module can be explained in terms of "setting" and "resetting" inputs and outputs. Input in0 and output out1 are said to be "set" when they are at a LOW value, and input in0 and output out1 are said to be "reset" when the are at a HIGH value. Input in1 and output out0 are said to be "set" when they are at a HIGH value, and input in1 and output out0 are said to be "reset" when they are at a LOW value.

With these definitions of "set" and "reset" for each of the inputs and outputs, the operation of an asynchronous pipeline module is as follows. When all inputs of a pipeline module are set, the pipeline module will "fire," i.e., the NAND gate will assert a LOW signal, and all inputs of the pipeline module will be reset, and all outputs will be set.

Each of the inputs and outputs will be driven to a HIGH value or a LOW value for only a brief period. For this reason, each input and output must be connected to a keeper. A keeper is a circuit that keeps the value of a wire in one of two states, and which can be easily switched from one state to another. The keeper circuits are not shown in FIGS. 9 and 10.

The basic asynchronous pipeline module 262 shown in FIGS. 10(a) and 10(b), or minor modification thereof, is used for each module 262 in the control circuit cell array 260 shown in FIG. 9. The only modification that may be required is to reduce the number of inputs and/or outputs of the module as is necessary to complete construction of the array. For example, the module labeled d3 has two inputs but no output. To implement this particular module, all that needs to be done is to remove pull-up transistor 312 with output out0 and pull-down transistor 314 with output out1.

Referring to FIG. 9, it is seen that some of the arrowheads are darkened in. This notation is used to indicate the initialization of the connection to that input. If the left arrowhead inside an asynchronous pipeline module as in FIG. 10(a) is darkened in, then the connection for input in0 is initialized in the LOW state, that is, in0 is initially set. If the right arrowhead inside an asynchronous pipeline module as in FIG. 10(a) is darkened in, then the connection for input in1 is initialized in the HIGH state, that is, in1 is initially set.

The connections between modules in FIG. 9 ensure that the sequences of moves for each cell are executed according to the specifications given before by means of the snippets. For example, the connections in cell 1 in FIG. 9 between the modules labeled r0, r1, rr0, rr1 and d1 ensure that the sequences of moves given by *[r0;(r1|rr1;rr0;d1)] is executed properly.

Initially, module r1 will fire as soon as connection 210 becomes set. When module r0 fires, the inputs to module r0 are reset, and the inputs to modules r1 and rr1 will be set. This means that either module r1 or rr1 will fire next. If module r1 fires, the behaviors of call 1 are back in their initial state. If module rr1 fires, the inputs to modules r1 and rr1 are reset and the input of module rr0 will be set. Once module rr0 fires, the input to module rr0 is reset and the input to module d1 will be set. The firing of module d1 will then reset the input to module d1 and set the input to module r0, and the behaviors of cell 1 are back in their initial state.

Figure 11:
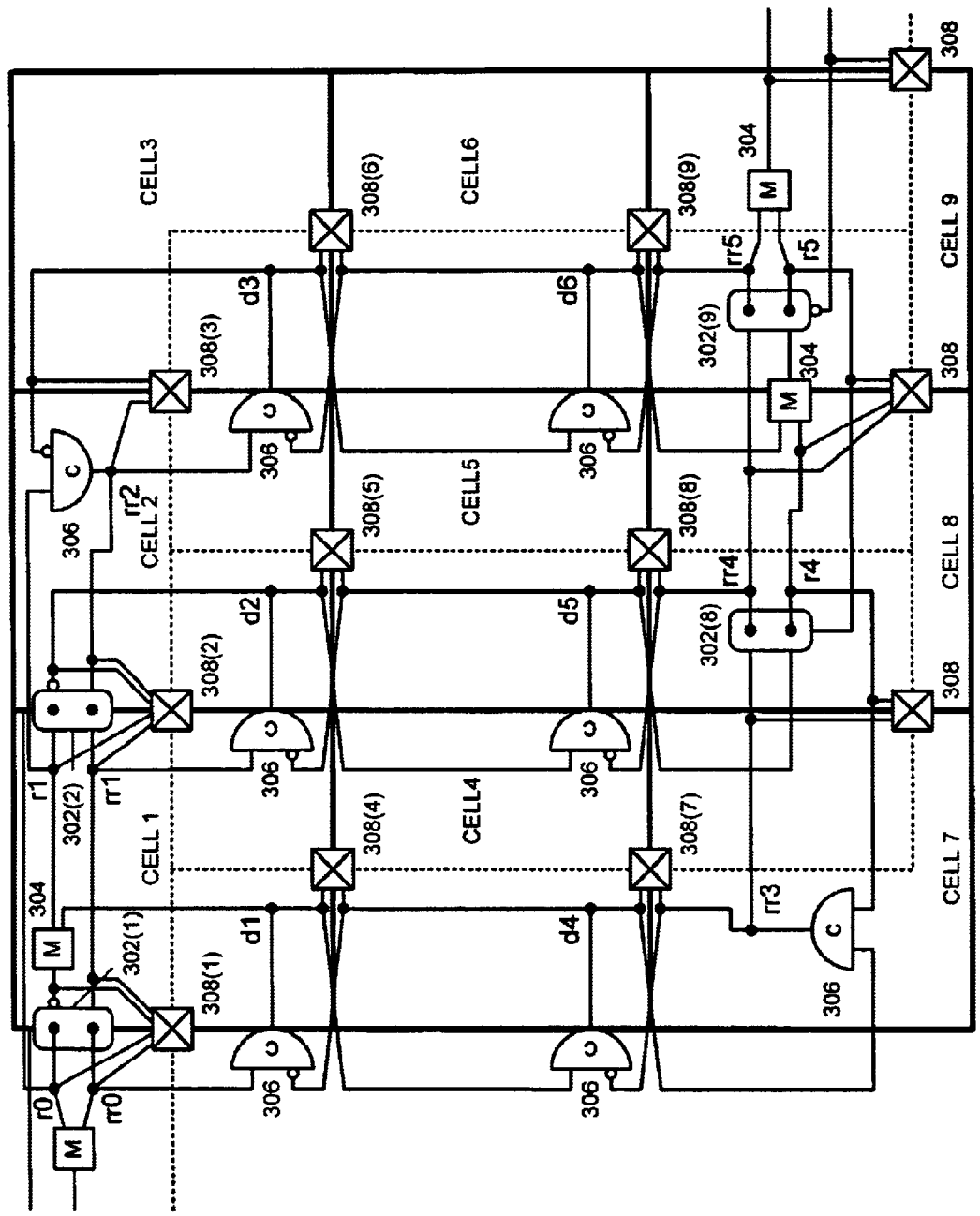
FIG. 11 shows an exemplary control circuit using transition signaling for a 3×3 FIFO according to the present invention.
Figure 12A:
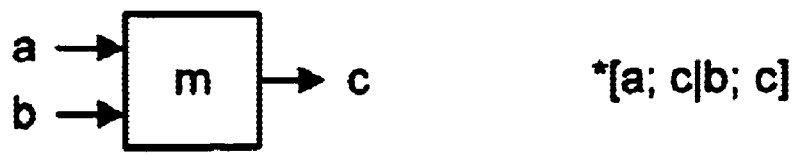
FIGS. 12(*a*)–(*c*) shows specifications for gates used in the control circuit shown in FIG. 11.
Figure 12B:
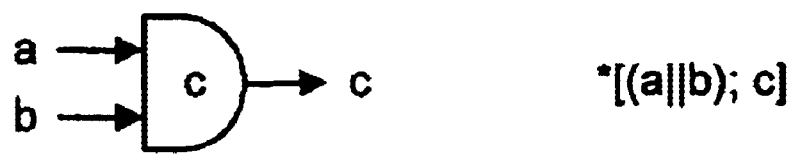
Figure 12C:
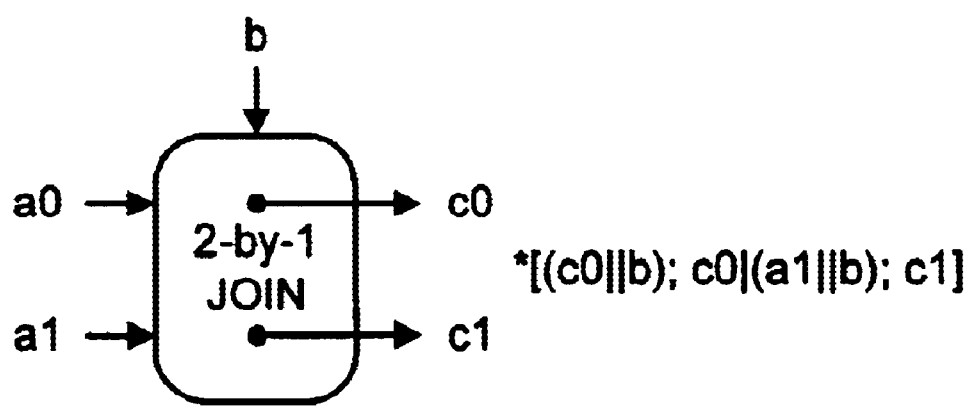

Referring now to FIG. 11, there is shown an alternative exemplary embodiment of a control circuit 300 according to the present invention. In this embodiment, transition signaling is used to move data items through the data path. Accordingly, an event represents a voltage transition, which may be a rising or a falling transition. The same notations as used in FIGS. 7–9 are used to represent events occurring across cell boundaries. Control circuit 300 is comprised of two-by-one join gates 302, merge gates 304, Muller C-elements 306 and pass gates 308. The input/output sequences of events for these various gates are shown in FIGS. 12(a)–(c). As before, the "*" means that the sequence of events within the brackets is repeated. The symbol "|" means that either the sequence of events preceding the "|" is performed or the sequence of events following the "|" are performed. The "||" symbol means that both the event preceding the "||" and the event following the "||" are performed in parallel. Events separated by ";" are performed sequentially, from right to left in the list. Note that the concatenation ";" has a higher priority than the single bar "|" and the parallel bar "||".

A small circle at an input of a gate in FIG. 11 is used to denote that that input is "initialized". So, for example, the small circle at the input of the two-by-one join 302(1) is present to indicate that that input has initially already happened. The pass gates in this exemplary embodiment work slightly different from the pass gates in the previously described embodiment. In FIG. 11, the pass gates have a number of inputs labeled with an "O" and a number of inputs labeled with a "T". When and event, i.e. a voltage transition, occurs on one of the "O" inputs, the pass gate becomes opaque. When a voltage transition occurs on a "T" input, the pass gate becomes transparent. In this embodiment, initially all pass gates are transparent, as opposed to the previously described embodiment where all pass gates are initially opaque.

The connections between the circuit primitives in FIG. 11 ensure that the sequences of moves for each cell are executed according to the specifications given before by means of the snippets. For example, the sequences of events for cell 1, given by *[r0;(r1|rr1;rr0;d1)], are implemented as follows. Initially, the environment will signal that data is valid for cell 1 by causing an event on rpr. Following event rpr comes event r0, because of the initialized input of the two-by-one join gate. The first event r0 starts the sequence of events for cell 1. When event r0 occurs, data has been propagated through the transparent pass gate 308(1) and stored in a sticky buffer (not shown in FIG. 11). Event r0 causes, through join gate 302(2), event r1 or rr1. After an r1 event, the behaviors for cell 1 are back in the initial state. After an rr1 event, however, first event rr0 must occur, through join gate 302(1), and then event d1 must occur, through Muller C-element 306(1), before the behaviors for cell 1 are back in the initial state.

Events r0 and rr0 indicate that a data item has been moved from the environment and stored in cell 1, and so these events can make pass gate 308(1) opaque to prevent the overwriting by another data item. Events r1 and rr1 indicate that a data item has been moved out of cell 1 and stored in cell 2. Consequently, these events can make pass gate 308(2) opaque to prevent the overwriting by another data item. Events r1 and rr1 can also make pass gate 308(1), possibly after a MERGE delay, transparent to allow another data item to move into cell 1. Event d1 indicates that a data item has been stored in cell 4, and so this event can make pass gate 308(4) opaque and pass gate 308(1) transparent, after a MERGE delay.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A first-in, first-out (FIFO) data structure, comprising:
a N-row-by-M-column array of data path cells, where N is greater than one and M is greater than one; and
control circuitry coupled to the array configured to sequentially move individual data items from an input cell in an input row of cells to particular cells of the input row of cells, separately through each of the M columns of cells, and then sequentially from particular cells of an output row to an output cell of the output row, such that the individual data items are output in the order received.

2. The FIFO data structure of claim 1, wherein the control circuit is comprised of a plurality of asynchronous pipeline modules configured so that at least one asynchronous pipeline module controls data propagation between adjacent cells.

3. The FIFO data structure of claim 2, wherein each asynchronous pipeline module comprises:
a NAND logic gate having a first input configured to receive a first control signal, a second input configured to receive an inverse of a second control signal and an output;
a first inverter coupled between the output of the NAND logic gate and an associated pass gate so that the pass gate receives the inverse of the output of the NAND logic gate;
a first transistor having a gate coupled to the inverse of the output of the NAND logic gate, a drain coupled to the first control signal and a source coupled to ground;
a second transistor having a gate coupled to the output of the NAND logic gate, a drain coupled to the second control signal and a source coupled to a power supply; and
at least one drive transistor having a gate coupled to the gate of either the first or second transistor, a source coupled to either ground or the power supply, respectively, and a drain that embodies an output of the asynchronous pipeline module.

4. The FIFO data structure of claim 1, wherein the control circuit comprises a circuit utilizing transition signaling, the control circuit including a plurality of join elements coupled to respective pass gates for controlling the transfer of a data item along the data path, wherein a join element between a predecessor cell and a successor cell is configured to receive a first signal indicating that a data buffer in the successor cell is empty, a second signal indicating that the data item is present in the predecessor cell and is ready to be passed to the successor cell, and an associated pass gate is transparent when the first signal is received and opaque when the join element provides an output acknowledging that the data item has been transferred from the predecessor cell to the successor cell.

5. A nonlinear first-in, first-out (FIFO) data structure, comprising:

an input data path cell configured to receive an ordered stream of data items via an input interconnect;

an output data path cell configured to receive the ordered stream of data via an output interconnect;

a plurality of intermediate data path cells connected between the input data path cell and the output data path cell in an array of rows and columns, wherein a first row is coupled to the input data cell and a last row is coupled to the output data path cell;

a plurality of intermediate interconnects connecting each intermediate cell with intermediate cells adjacent to it; and control circuitry coupled to the input, output and intermediate interconnects configured to sequentially move individual data items from the input cell to particular data path cells in the first row, separately down columns of the data path cells, and then sequentially from particular data path cells of the last row to the output cell, such that the individual data items are output to the output cell in the order received at the input cell.

6. A first-in, first-out (FIFO) data structure, comprising:

an input pass gate configured to receive an ordered stream of data items from an input cell;

an N-row-by-M-column array of data path cells, where N is greater than one and M is greater than one, the array of data path cells having an input row coupled to the input cell;

a plurality of pass gates, each pass gate interconnecting adjacent cells in the input row, adjacent cells in an output row, and cells adjacent to the remaining cells in the array, each pass gate configured to receive a data item from a previous cell and sequentially pass the received data item to a next cell according to a predetermined sequence;

a control circuit that controls the individual movement of data items through the plurality of pass gates, first through successive pass gates of the input row cells, from selected input row cells through successive pass gates of columns comprising, in part, the remaining cells, and then through successive pass gates of the output row; and an output pass gate coupled to the Mth-row, Nth-column cell, configured to output the processed data items, wherein the control circuit follows the predetermined sequence such that the data items are output in the order received at the input pass gate.

7. The data structure according to claim 6, wherein each cell of the array further comprises a buffer circuit having an amplifier that restores and outputs a value received on an input.

8. The data structure according to claim 7, wherein the buffer circuit maintains the output value until directed by the control circuit to output a new value.

9. The data structure according to claim 6, wherein each cell contains no more than one data item at a time.

10. A data structure having an N-row-by-M-column array of communication cells, comprising:

a data path circuit having a plurality of sticky buffers, one to each cell, and a plurality of pass gates, configured to communicatively couple adjacent cells in an input row of the array, adjacent cells in an output row of the array, and any cell adjacent to other cells in the array; and a control circuit that controls movement of data items in the data path circuit from one sticky buffer to a next sticky buffer, by making a pass gate therebetween briefly transparent.

11. The data structure of claim 10, wherein the control circuit is comprised of a plurality of asynchronous pipeline modules configured so that for each two adjacent cells at least one asynchronous pipeline module controls data propagation between the each adjacent cells.

12. The data structure of claim 11, wherein each asynchronous pipeline module comprises:

a NAND logic gate having a first input configured to receive a first control signal, a second input configured to receive an inverse of a second control signal, and an output;

a first inverter coupled between the output of the NAND logic gate and an associated pass gate so that the pass gate receives the inverse of the output of the NAND logic gate;

a first transistor having a gate coupled to the inverse of the output of the NAND logic gate, a drain coupled to the first control signal and a source coupled to ground;

a second transistor having a gate coupled to the output of the NAND logic gate, a drain coupled to the second control signal and a source coupled to a power supply; and at least one drive transistor having a gate coupled to the gate of either the first or second transistor, a source coupled to either ground or the power supply, respectively, and a drain that embodies an output of the asynchronous pipeline module.

13. The data structure of claim 10, wherein the control circuit comprises a circuit utilizing transition signaling, the control circuit including a plurality of join elements coupled to respective pass gates for controlling the transfer of a data item along the data path, wherein a join element coupled between a predecessor cell and a successor cell is configured to receive a first signal indicating that a data buffer in the successor cell is empty and a second signal indicating that the data item is present in the predecessor cell and ready to be passed to the successor cell, and an associated pass gate that becomes transparent when the first signal is received and becomes opaque when the join element provides an output acknowledging that the data item has been transferred from the predecessor cell to the successor cell.

14. A method of moving data items through a two-dimensional first-in, first-out (FIFO) arranged in an N-row-by-M-column array of individual FIFO cells, the method comprising the steps of:

moving a first data item into an input cell located in an input row and an input column of the array;

moving the first data item through cells in the input row and into an Mth cell in the Mth column;

moving the first data item down through cells in the Mth column and into an output cell in the Nth row;

moving the first data item out of the output cell;

moving every k-th data item, where 0<k<M+1, into the input cell;

moving the k-th data item through cells in the input row and into an (M+1−k)th cell in the (M+1−k)th column;

moving every k-th data item down through cells in the (M+1−k)th column and into the (M+1−k)th cell in the Nth row;

moving every k-th data item into the output cell in the Nth row; and moving every k-th data item out of the output cell.

15. A two-dimensional first-in, first-out (FIFO) data structure, comprising:

an N-row-by-M-column array of individual FIFO cells having a data path, including
a data buffer within each FIFO cell;
a pass gate between adjacent cells; and
a control circuit in communication with the data path and configured to control data propagation along various predefined routes in the data path.

16. The two-dimensional FIFO circuit of claim 15, wherein the control circuit is comprised of a plurality of asynchronous pipeline modules configured so that at least one asynchronous pipeline module controls data propagation between adjacent cells.

17. The two-dimensional FIFO circuit of claim 16, wherein each asynchronous pipeline module comprises:

a NAND logic gate having a first input configured to receive a first control signal, a second input configured to receive an inverse of a second control signal and an output;

a first inverter coupled between the output of the NAND logic gate and an associated pass gate so that the pass gate receives the inverse of the output of the NAND logic gate;

a first transistor having a gate coupled to the inverse of the output of the NAND logic gate, a drain coupled to the first control signal and a source coupled to ground;

a second transistor having a gate coupled to the output of the NAND logic gate, a drain coupled to the second control signal and a source coupled to a power supply; and at least one drive transistor having a gate coupled to the gate of either the first or second transistor, a source coupled to either ground or the power supply and a drain that embodies an output of the asynchronous pipeline module.

18. The two-dimensional FIFO circuit of claim 17, wherein the inverse of the output of the NAND logic gate controls whether the associated pass gate is transparent or opaque to data.

19. The two-dimensional FIFO circuit of claim 15, wherein the control circuit comprises a circuit utilizing transition signaling the control circuit including a plurality of join elements coupled to respective pass gates for controlling the transfer of a data item along the data path, wherein a join element coupled between a predecessor cell and a successor cell is configured to receive a first signal indicating that a data buffer in the successor cell is empty and a second signal indicating that the data item is present in the predecessor cell and ready to be passed to the successor cell, and an associated pass gate that becomes transparent when the first signal is received and becomes opaque when the join element provides an output acknowledging that the data item has been transferred from the predecessor cell to the successor cell.

20. An asynchronous pipeline module for use in a multi-dimensional FIFO data structure, comprising:

a NAND logic gate having a first input configured to receive a first control signal, a second input configured to receive an inverse of a second control signal and an output;

a first inverter coupled between the output of the NAND logic gate and an associated pass gate so that the pass gate receives the inverse of the output of the NAND logic gate;

a first transistor having a gate coupled to the inverse of the output of the NAND logic gate, a drain coupled to the first control signal and a source coupled to ground;

a second transistor having a gate coupled to the output of the NAND logic gate, a drain coupled to the second control signal and a source coupled to a power supply; and at least one drive transistor having a gate coupled to the gate of either the first or second transistor, a source coupled to either ground or the power supply, respectively, and a drain that embodies an output of the asynchronous pipeline module.

* * * * *